(No Model.)
S. D. FORBES.
SPOKE SOCKET.
No. 432,699. Patented July 22, 1890.
Fig I.
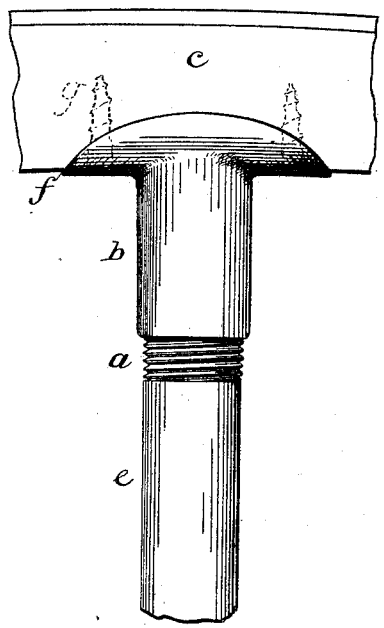
Fig II.
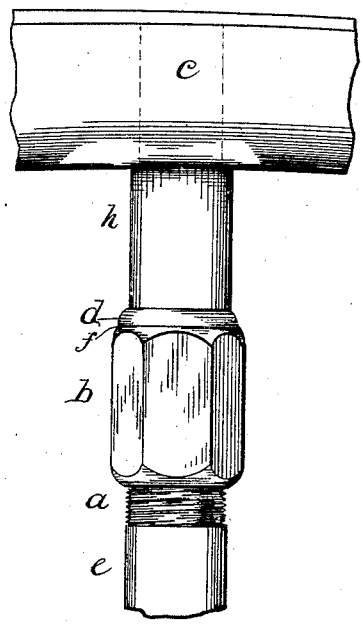
Fig III.
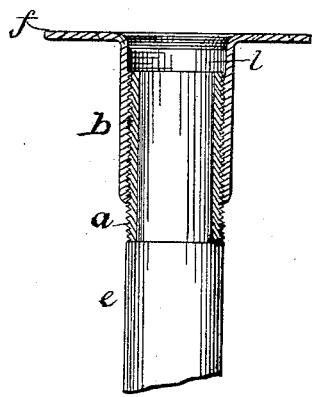
Fig IV.
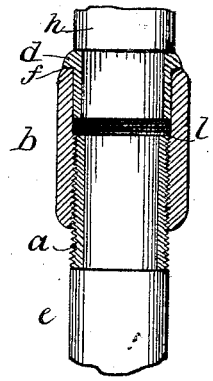
Witnesses.
S. E. Stevens
P. E. Stevens
Inventor.
Samuel D. Forbes.
W. E. Stevens. Atty.

UNITED STATES PATENT OFFICE.

SAMUEL D. FORBES, OF WILMINGTON, DELAWARE.

SPOKE-SOCKET.

SPECIFICATION forming part of Letters Patent No. 432,699, dated July 22, 1890.

Application filed May 5, 1890. Serial No. 350,622. (No model.)

*To all whom it may concern:*

Be it known that I, SAMUEL D. FORBES, a citizen of the United States, residing at Wilmington, in the county of New Castle and State of Delaware, have invented certain new and useful Improvements in Spoke-Sockets; and I do hereby declare the following to be a full, clear, and exact description of the invention, such as will enable others skilled in the art to which it appertains to make and use the same.

This invention relates to spoke-sockets usually forming metallic connection between the spoke and felly of a wheel; and its object is to provide means whereby broken spokes may be repaired or replaced without taking the tire off or loosening the felly from the remaining sound spokes, and whereby the rim of the wheel may be forced out to its normal circular form, from which it usually springs or is pressed inward at the point where a spoke has been broken.

To this end my invention consists in the construction and combination of parts forming a spoke-socket hereinafter described and claimed, reference being had to the accompanying drawings, in which—

Figure I is a side view of a portion of a wheel, showing my spoke-socket in service to repair a spoke-wheel which has been broken off at the shoulder of the tenon. Fig. II is a side view of a portion of a wheel, showing my spoke-socket as applied to a spoke at some distance from the felly. Fig. III is a vertical section of the socket for use between the spoke and felly, and Fig. IV is a vertical section of a socket for use upon the spoke to connect two parts thereof.

$a$ represents a ferrule of thin metal screw-threaded on its outside.

$b$ is a sleeve internally screw-threaded to engage the thread upon ferrule $a$, and provided at its upper end with a shoulder to bear against the felly $c$, or against a shouldered ferrule $d$.

$e$ is the body of a spoke. The commonest place for spokes to be broken off is at the tenon close to the shoulder that rests on the felly. To repair such a break by means of my spoke, first fit the outer end of the spoke to receive the ferrule $a$, driven tightly thereon, then screw the sleeve, which is the socket proper, clear down upon the ferrule. Now place the end of the spoke back where it should be under the felly and screw the sleeve upward until the felly is crowded into its proper circular form. The shoulder $f$ of the sleeve $b$ is in this instance a broad flange, which may have holes in it to receive screws $g$, and which may, if so desired, be bent up against the rounded corners of the felly, as shown in Fig. I.

If the spoke be broken off at a little distance from the felly, the remaining body portion may be sawed square off at its outer end and be fitted to receive the ferrule $a$, to be driven tightly thereon. A new spoke end $h$ may be cut to the required length and a ferrule $d$ be fitted tightly on its inner end, and its outer end be doweled to fit the old hole in the felly and be driven firmly therein. Now the sleeve $d$, having been screwed down on the ferrule $a$, as before described, is to be screwed outward around the body of the ferrule $d$, which fits freely within it, until it bears its shoulder $f$ against the shoulder of the ferrule $d$, as shown in Figs. II and IV, and pushes the felly out to place. The shoulder $f$ might be allowed to bear against a shoulder of the wooden spoke end $h$; but that would not be durable if fitted loosely enough to be turned thereon, and I prefer interposing the metallic shouldered ferrule $d$. If the remaining body of the spoke after breakage is unsound or too short to be profitably left in, it may be removed from the hub and a new spoke of full length be fitted both to the hub and felly, then be sawed square in two at a suitable point, preferably near its outer shoulder, then the ferrules $a$ $d$ may be fitted upon the parts and each be driven to place. Now the sleeve $b$ may be applied, as above described, and the wheel is repaired without the damage to it and the expense consequent to taking off the tire and driving the felly loose from the adjacent spokes to admit a spoke in the old style.

The characteristic features of my invention are, the screw-threaded ferrule $a$ and the sleeve $b$, fitted to screw upon it and having a shoulder $f$ to bear against the felly directly, as in Fig. I, or against an attachment to the felly—such as the spoke end $h$ and the shouldered ferrule $d$ on it—and this shouldered ferrule $d$ having its body fitted for the sleeve to turn freely around it to keep the spoke in line is a minor feature.

In Figs. III and IV the sleeve $b$ is adapted to fit upon the spoke $e$ by means of the screw-threaded ferrule $a$, and the screw-thread between the ferrule and sleeve is the means for lengthening the spoke to fit to the felly.

In spokes broken off at the tenon the sleeve $b$ is all that is required to serve as the connection referred to in the claims; but when the spoke has been broken somewhere midway the sleeve $b$ is aided by the spoke end $h$ and shoulder $d$ to form the said connection.

Having thus fully described my invention, what I believe to be new, and desire to secure by Letters Patent, is the following:

1. The combination, in spoke-repairing sockets, of a ferrule screw-threaded on its outside and driven tightly upon the spoke, both spoke and ferrule being too short to reach the felly, and a connection extending from the spoke to the felly and having an internal screw-thread and adapted to be turned as a nut upon the said ferrule, substantially as described.

2. The combination, in spoke-repairing sockets, of a ferrule screw-threaded on its outside and driven tightly upon the spoke, both spoke and ferrule being too short to reach the felly, and a connection extending from the spoke to the felly and having an internal screw-thread and adapted to be turned as a nut upon the said ferrule, and further adapted, first, to revolve with its flange against the under side of the felly, and afterward to be turned up at the sides thereof, substantially as described.

In testimony whereof I affix my signature in presence of two witnesses.

SAMUEL D. FORBES.

Witnesses:
J. JACKSON PEIRCE,
WM. BRIGHT.